US006205985B1

(12) United States Patent
Funagayama

(10) Patent No.: US 6,205,985 B1
(45) Date of Patent: Mar. 27, 2001

(54) CATALYST FOR REFORMING FOSSIL FUEL

(75) Inventor: Niro Funagayama, Nagoya Aichi (JP)

(73) Assignee: Japan Environmental System Co., Ltd., Nagoya Aichi (JP)

(*) Notice: Subject to any disclaimer, the term of this patent is extended or adjusted under 35 U.S.C. 154(b) by 0 days.

(21) Appl. No.: 09/419,117

(22) Filed: Oct. 15, 1999

(30) Foreign Application Priority Data

Sep. 28, 1999 (JP) .................................................. 11-275294

(51) Int. Cl.[7] .................................................. F02M 31/18
(52) U.S. Cl. .................................................. 123/538
(58) Field of Search .................................. 123/536, 537, 123/538, 539

(56) References Cited

U.S. PATENT DOCUMENTS 4,267,976 * 5/1981 Chatwin ................................. 123/538
5,393,723 * 2/1995 Finkl ...................................... 123/538
6,050,247 * 4/2000 Ichimura ................................ 123/538

* cited by examiner

Primary Examiner—Marguerite McMahon
(74) Attorney, Agent, or Firm—Armstrong, Westerman, Hattori, McLeland & Naughton

(57) ABSTRACT

The object of the present invention is to provide a catalyst, by which it is possible to decrease both black smoke content and NOx content in exhaust gas. The present invention provides a catalyst, which is placed between a fossil fuel tank and a combustion chamber of engine, and the catalyst comprises clay, cerium and thorium as main components, ceramic catalyst produced from the main components by reduction sintering and used for decomposing fossil fuel by catalytic cracking, a platinum catalyst or a catalyst containing platinum, and a magnet.

8 Claims, 2 Drawing Sheets

CATALYST FOR REFORMING FOSSIL FUEL

BACKGROUND OF THE INVENTION

The present invention relates to a catalyst for reforming fossil fuel, and in particular, to a catalyst for extensively decreasing black smoke content, NOx content, CO content and HC content in exhaust gas and for increasing power efficiency and improving fuel consumption.

In a new vehicle or a vehicle with travel distance of less than several tens of thousand kilometers, combustion efficiency of engine is high, and the content of harmful gas components in exhaust gas is relatively low.

However, when a vehicle is used for many years and travel distance is increased, combustion efficiency is decreased and the content of harmful gas components in exhaust gas is increased. In particular, in a vehicle driven by Diesel engine, black smoke content in exhaust gas is increased, and this is said to be one of major causes of air pollution.

To solve these problems, various methods have been proposed in the past. In many of these methods, however, it is proposed that an apparatus is mounted on a part of exhaust gas pipe and exhaust gas after combustion is processed by adsorption or by catalytic effects, and this does not directly lead to the improvement of combustion efficiency of the fuel.

In the methods to improve combustion efficiency of fuel, it is proposed that an active agent is directly placed in fuel tank or it is filled in a container installed on a passage leading from fuel tank to combustion chamber of engine. However, performance and physical properties of the active agent are incomplete and have many defects, and it is not suitable for practical application.

In fact, it is not very difficult to decrease only black smoke content in exhaust gas but when black smoke content is decreased, NOx content increases. If NOx content is decreased, black smoke content increases. Thus, it is very difficult to decrease both black smoke content and NOx content.

Specifically, under the condition where incombustible components in gasoline are completely burnt, black smoke content is decreased. Then, nitrogen is also necessarily oxidized, and NOx content increases.

SUMMARY OF THE INVENTION

It is an object of the present invention to provide a catalyst, by which it is possible to decrease both black smoke content and NOx content in exhaust gas.

Also, it is another object of the invention to provide a ceramic catalyst, by which it is possible to decompose fossil fuel by catalytic cracking and to reform it to a substance easily combustible.

To attain the above objects, according to the present invention, a catalyst is placed between fossil fuel tank and combustion chamber of engine and used for reforming fossil fuel, and said catalyst comprises clay, cerium and thorium as main components, ceramic catalyst produced from said main components by reduction sintering and for decomposing the fossil fuel by catalytic cracking, a platinum catalyst or a catalyst containing platinum, and a magnet.

Also, the ceramic catalyst of the present invention comprises clay, cerium and thorium as main components and these components are processed by reduction sintering.

The above and other objects and advantages of the invention will become more apparent from the description given below.

DETAILED DESCRIPTION OF THE PREFERRED EMBODIMENTS

Figure 1:
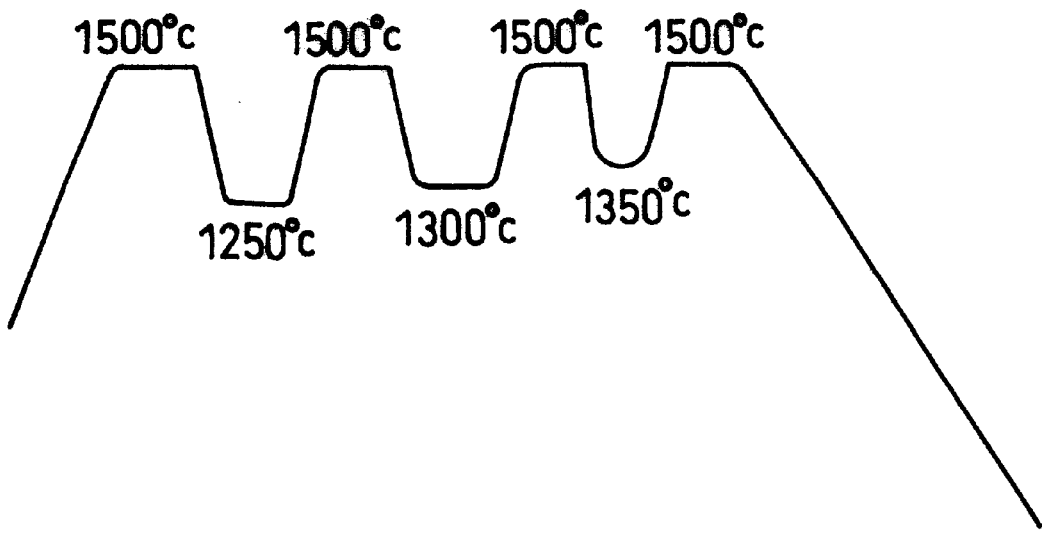
FIG. 1 is a diagram showing temperature and time when ceramic catalyst of the present invention is processed by reduction sintering.

In the following, description will be given on embodiments of the present invention.

The ceramic catalyst used in the present invention is believed to be a new type of catalyst not described in the literature. It is a ceramic catalyst, which contains clay as matrix component and cerium and thorium as main components and further contains elements, such as zinc, tin, or cobalt, to decrease black smoke, and this catalyst has an effect to decompose fossil fuel by catalytic cracking. As a result, it is possible to reduce both black smoke content and NOx content.

More concretely, it is preferable to use a ceramic catalyst, which contains clay, thorium, zinc, tin, magnesium and calcium.

The ceramic catalyst used in the present invention decomposes fossil fuel by catalytic cracking and turns it to a substance containing low molecular weight components at high percentage. Further, it has an effect to facilitate mixing of fine fuel fog with air in combustion chamber of engine and for reforming the fuel to achieve complete combustion.

Catalytic cracking of fossil fuel by the ceramic catalyst of the present invention can be demonstrated from the fact that the ratio of volatile components of the fossil fuel is increased by the use of the catalyst of the present invention.

The preferable mixing ratios of the components are as follows: $ThO_2$ 20–30 weight parts, $CeO_2$ 30–40 weight parts, $ZnO_2$ 2.0–3.0 weight parts, $SnO_2$ 1–5 weight parts, $CoO$ 1–3 weight parts, and the remainder is acid clay.

If the content of acid clay is too low, compressive strength and friction weight loss of the catalyst are decreased. If it is too high, the catalytic effect is decreased.

If the content of thorium or cerium is too low, the NOx content is not decreased sufficiently. If it is too high, the black smoke content is increased.

Zinc, tin and cobalt have the effect to decrease black smoke content, and it will suffice if at least one of them is present. However, if all of these three elements are present, the black smoke content can be extremely decreased.

The above components are turned to fine powder and are mixed together by pulverizing to particle size of 10–15 microns. This powder is processed by reduction sintering, and the ceramic catalyst of the present invention is prepared.

If particle size is too small, it is inconvenient to handle. If it is too large, water absorption of the ceramic catalyst is increased, and this leads to the decrease of catalyst effect.

Reduction sintering is preferably performed at 800° C.–1500° C. If it is performed at temperature lower than 800° C., sintering is not carried out sufficiently, and the desired strength cannot be obtained. If it is performed at higher than 1500° C., reaction of substances with lower melting point occurs and gas is generated. Then, pores are formed inside and on the surface of the ceramics, and this leads to lower strength.

It is preferable to perform reduction sintering within temperature range of 800° C.–1500° C. by repeatedly increasing and decreasing the temperature by 100° C. or more. More concretely, it is preferable that, after sintering has been performed by increasing temperature from 800° C. to 1500° C., sintering is performed again by decreasing the temperature from 1500° C. to 1200° C. and it is then increased to 1500° C. and sintering is performed at 1500° C., i.e. by repeatedly changing temperature in the range between 1500° C. and 1200° C.–1400° C. to produce a catalyst with better performance characteristics. Further, it is preferable to gradually decrease the range of temperature change.

The ceramic catalyst as described above is used with a platinum catalyst or a catalyst containing platinum.

As the catalyst containing platinum used in the present invention, Pt—Re catalyst, Pt—Pd—Re catalyst, etc. may be used. However, there is no special restriction and any type of catalyst containing Pt may be used.

Platinum catalyst may be turned to granular state and mixed with the ceramic catalyst of the present invention and used, or these may be placed separately in a container and used. Or, platinum may be coated on net-like portion of a container, which contains catalyst.

Mixing ratio of the platinum catalyst or the catalyst containing platinum to the ceramic catalyst is preferably 0.5–20 weight %. If it is lower than 0.5 weight %, black smoke content decreases but NOx content increases. If it is higher than 20 weight %, NOx content decreases, but black smoke content increases.

If a magnet is simultaneously used as a co-catalyst to the ceramic catalyst and the platinum catalyst, both black smoke content and NOx content can be extensively decreased. When only ceramic catalyst and platinum are used, it is not possible to extensively decrease NOx content.

As the magnet used in the present invention, a permanent magnet or an electromagnet may be used. It is preferable to use the magnet by 25–35 weight % to the total weight (total weight of ceramic catalyst, platinum catalyst and magnet).

If the quantity of the magnet used is too low, NOx content is not decreased enough. If it is too high, black smoke content increases.

In case permanent magnet is used, it is preferable to design in such manner that coil is wound on outer side of a pipe, which is filled with the catalyst of the present invention, and electric current is supplied to the coil to attain the effect of the magnet.

It is preferable that the ceramic catalyst of the present invention has water absorption (according to JIS R2205) of not higher than 1.0%, compressive strength (according to JIS A5210) of not lower than 6,000 kg/cm$^2$, and friction weight loss (according to JIS A5209 7.8) of not higher than 0.1 g.

If water absorption increases, catalytic potency is decreased, and it is preferable that water absorption is closer to zero.

With the ceramic catalyst as described above, it is possible to decrease damage due to chipping or friction caused by vibration or impact during driving when it is used on a vehicle, and the ceramic catalyst can be used for long time in stable and economical manner.

When ceramic catalyst is in contact with fuel for long time, fuel components are infiltrated through pores of the ceramics to inside. In order to fulfill full catalytic function, it is preferable that ceramic catalyst has larger surface area and is porous. However, infiltration of fuel components may make texture of ceramics too fragile and may cause surface scaling or chipping.

When ceramic granules were immersed in fuel for 720 hours and compression strength test was performed before and after the immersion, it was found that strength was deteriorated in the ceramic granules, which have water absorption (according to JIS R2205) of more than 1%.

The damage of ceramic catalyst (e.g. chipping or friction of ceramics caused by vibration during driving of the vehicle) not only leads to economic loss due to shortening of service life of ceramics but also causes damage of engine components when particles and fine powder generated by cracking and chipping of ceramics enter combustion chamber, or it causes clogging of filter, and the influence is extremely serious.

Abrasion resistance of ceramic catalyst was determined as follows: Ceramics having different abrasion resistance were filled in metal containers and these were placed on a truck, and the truck was driven for about 150 hours in about one month. Then, abrasion resistance was determined according to weight loss of ceramic granules.

In the sample, which showed friction weight loss of more than 0.2 g when determined in accordance with JIS A5209 7.8 (ceramic tile) using sand-falling type friction tester, slight trace of friction was observed. However, in the sample showing friction weight loss of 0.1 g or less, no trace of friction was found.

In the following, description will be given on the features of the present invention referring to embodiments, while the present invention is not limited to these embodiments.

EXAMPLE 1

The following components were mixed together, and the mixture was pulverized to have particle size of 12 μm: acid clay by 15 weight parts, $ThO_2$ 22 by weight parts, $CeO_2$ by 32 weight parts, $ZnO_2$ by 2.5 weight parts, $SnO_2$ by 2.5 weight parts, and CoO by 0.7 weight parts.

To the above mixture, water was added, and the mixture was kneaded and molded, and this was processed by reduction sintering in a reduction furnace. Firing conditions were as shown in FIG. 1, i.e. temperature was increased to 1500° C. in 3 hours, and it was maintained at about 1500° C. for 8 hours. Temperature was then decreased from 1500° C. to 1250° C. in 30 minutes, and then it was maintained for 5 hours. Temperature was the increased to 1500° C. in 30 minutes and maintained for 8 hours, decreased to 1300° C. in 30 minutes and maintained for 5 hours, increased to 1500° C. in 30 minutes and maintained for 8 hours, decreased to 1350° C. in 30 minutes and maintained for 5 hours, and increased to 1500° C. and sintering was performed for 8 hours.

The ceramic catalyst thus obtained can be used in various forms. It is preferable to use it in large shape such as honeycomb-like shape and spherical or cylindrical shape with diameter (or lengths in longitudinal and lateral directions) of 0.5–50 mm.

EXAMPLE 2

Figure 2:
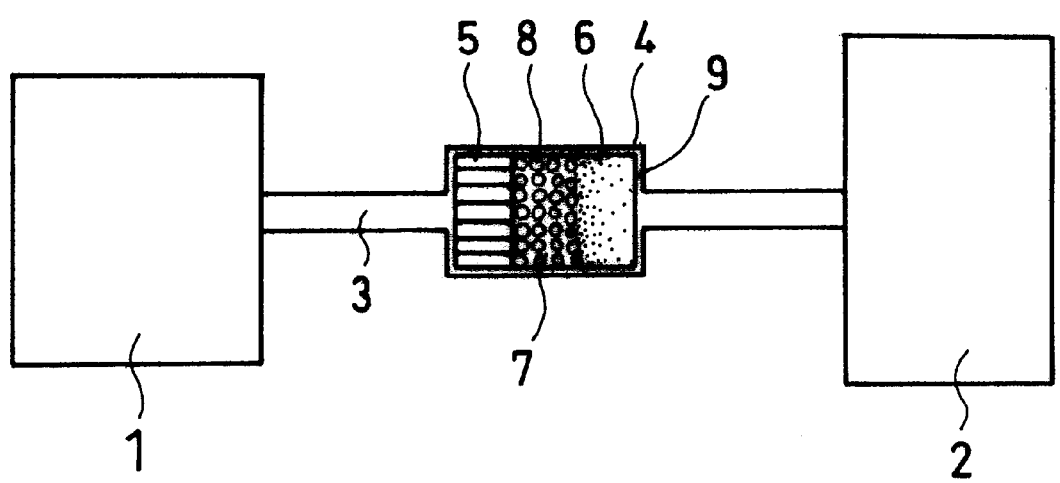
FIG. 2 is a schematical drawing to show the condition when the catalyst of the present invention is used in a vehicle.

The ceramic catalyst produced as described above [catalyst in honeycomb-like shape 5 (about 300 g); catalyst 6 of various shapes of 5–10 mm in diameter (or lengths in longitudinal and lateral directions) (about 300 g)] was used together with a permanent magnet 7 in spherical shape (300 g). As shown in FIG. 2, the catalyst was filled in a container 4, which was communicated with a pipe 3 connecting a tank 1 with an engine 2. The tank and the engine were placed on a vehicle (a Diesel engine truck (4-ton truck) manufactured by Isuzu Motor Co.; travel distance about 220,000 km). Then, 100 g of a granular platinum-rhenium catalyst was coated (9) at a forward end of a net-like metal container 8, which contains the catalyst. After driving the truck for a distance of 30 km, black smoke content, NOx content, CO content, and HC content were determined.

Comparative examples were prepared by the same procedure as above except the points described below, and black smoke content and NOx content were determined. The results are summarized in Table 1 as comparative example 1 to 7.

COMPARATIVE EXAMPLE 1

No catalyst was used.

COMPARATIVE EXAMPLE 2

Platinum-rhenium catalyst was mixed by 2 g.

COMPARATIVE EXAMPLE 3

Platinum-rhenium catalyst was mixed by 180 g.

COMPARATIVE EXAMPLE 4

No platinum catalyst was used.

COMPARATIVE EXAMPLE 5

Magnet was not used.

COMPARATIVE EXAMPLE 6

Magnet was mixed by 200 g.

COMPARATIVE EXAMPLE 7

Magnet was mixed by 400 g.

TABLE 1

| Examples and comparative examples | Black smoke content (%) | NOx content (ppm) | CO content (%) | HC content (ppm) |
|---|---|---|---|---|
| Example 2 | 6 | 21 | 0.03 | 0.07 |
| Comparative example 1 | 72 | 113 | 2.92–3.44 | 2.21–2.92 |
| Comparative example 2 | 43 | 78 | 2.03–2.45 | 1.11–1.06 |
| Comparative example 3 | 69 | 47 | 1.05–1.12 | 2.03–2.11 |
| Comparative example 4 | 23 | 87 | 1.86–1.91 | 2.17–2.20 |
| Comparative example 5 | 27 | 92 | 1.92–2.11 | 1.86–2.05 |
| Comparative example 6 | 18 | 35 | 0.78–0.90 | 0.96–1.22 |
| Comparative example 7 | 29 | 27 | 0.45–0.42 | 0.27–0.35 |

EXAMPLE 3

A ceramic catalyst was prepared by the same procedure as in Example 2 except that a catalyst with composition as shown in Table 2 was used, and black smoke content and NOx content were determined. The results are summarized in Table 3 as Examples 3 to 7.

TABLE 2

| Example | Acid clay | $ThO_2$ | $CeO_2$ | $ZnO_2$ | $SnO_2$ | CoO |
|---|---|---|---|---|---|---|
| 3 | 30 | 30 | 30 | 2 | 5 | 3 |
| 4 | 35 | 20 | 40 | 3 | 1 | 1 |
| 5 | 30 | 30 | 30 | 10 | 0 | 0 |
| 6 | 30 | 30 | 30 | 0 | 10 | 0 |
| 7 | 30 | 30 | 30 | 0 | 0 | 10 |

TABLE 3

| Example | Black smoke content (%) | NOx content (g/km) |
|---|---|---|
| 3 | 16 | 1.21 |
| 4 | 22 | 1.81 |
| 5 | 41 | 1.10 |
| 6 | 56 | 1.12 |
| 7 | 52 | 1.03 |

In a covered glass bottle, the ceramic catalyst of Example 1 was placed up to ⅓ of the inner space of the bottle. Light oil was filled to ⅔ of the bottle space, and a nail hole was opened on the lid of the bottle. This was left to stand on sunny window side. After about 15 days, when temperature inside the glass bottle was increased by sunlight, light oil began to move and it was injected through the nail hole. For comparison purpose, another glass bottle was used, which was prepared under the condition except that the ceramic catalyst was not used. No change was observed in the latter.

These results suggest that the fossil fuel (light oil) was decomposed to volatile components with low molecular weight by catalytic effect of the ceramic catalyst.

The effects of the present invention is not completely elucidated from theoretical viewpoint. However, from the fact that fossil fuel is turned to low molecular weight components by the ceramic catalyst of the present invention as seen in Example 3 described above, it is estimated that the fuel becomes easily combustible and complete combustion can be accomplished even under the condition where it is difficult to oxidize nitrogen.

As described above, according to the present invention, it is possible to reform fossil fuel before combustion, and by combining it with other catalysts, both black smoke content and NOx content can be extensively decreased, and such surprising effects as not to have been observed in conventional type catalyst can be attained.

Also, the ceramic catalyst of the present invention exhibits an excellent effect not found in the conventional type catalyst, i.e. to decompose fossil fuel by catalytic cracking. By combining this ceramic catalyst with the other catalysts, both black smoke content and NOx content can be extensively decreased to such extent as not seen in the conventional type catalyst used in the past.

What is claimed is:

1. A catalyst for reforming fossil fuel placed between a fossil fuel tank and a combustion chamber of engine, said catalyst comprising a ceramic catalyst including clay, cerium and thorium as main components, said ceramic catalyst produced by reduction sintering of said components and used for decomposing said fossil fuel by catalytic cracking, in conjunction with a platinum catalyst or a catalyst containing platinum, and a magnet.

2. A catalyst according to claim 1, wherein said platinum catalyst or said catalyst containing platinum is 0.5–20% of the weight of said ceramic catalyst.

3. A catalyst according to claim 2, wherein said reduction sintering is performed at a temperature of 800° C.–1500° C.

4. A catalyst according to claim 3, wherein said reduction sintering is performed within a temperature range of 800° C.–1500° C. by repeatedly increasing or decreasing the temperature by more than 100° C.

5. A catalyst according to claim 1, wherein said ceramic catalyst further contains zinc, tin, magnesium and cobalt.

6. A catalyst according to claim 5, wherein said magnet is a permanent magnet, and said permanent magnet is 25–35% of the total weight of the catalyst.

7. A ceramic catalyst for decomposing fossil fuel by catalytic cracking, said catalyst containing clay, cerium and thorium as main components, and said components being processed by reduction sintering.

8. A catalyst according to claim 7, wherein said ceramic catalyst further contains zinc, tin, magnesium and cobalt.

* * * * *